(12) United States Patent
Chen et al.

(10) Patent No.: US 11,356,878 B2
(45) Date of Patent: Jun. 7, 2022

(54) DEVICE AND METHOD FOR USER EQUIPMENT SIDE AND BASE STATION SIDE IN WIRELESS COMMUNICATION

(71) Applicant: Sony Corporation, Tokyo (JP)

(72) Inventors: Jinhui Chen, Beijing (CN); Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/744,209

(22) Filed: Jan. 16, 2020

(65) Prior Publication Data

US 2020/0154302 A1    May 14, 2020

Related U.S. Application Data

(63) Continuation of application No. 15/556,339, filed as application No. PCT/CN2016/076959 on Mar. 22, 2016.

(30) Foreign Application Priority Data

Apr. 1, 2015  (CN) .......................... 201510151725.5

(51) Int. Cl.
*H04W 24/10*    (2009.01)
*H04W 36/08*    (2009.01)
(Continued)

(52) U.S. Cl.
CPC ........... *H04W 24/10* (2013.01); *H04W 24/00* (2013.01); *H04W 36/30* (2013.01); *H04W 76/27* (2018.02); *H04W 88/02* (2013.01); *H04W 88/08* (2013.01)

(58) Field of Classification Search
None
See application file for complete search history.

(56) References Cited

U.S. PATENT DOCUMENTS

| 8,265,035 | B2 | 9/2012 | Du et al. | |
|---|---|---|---|---|
| 2009/0023447 | A1* | 1/2009 | Hagerman | H04W 36/0085 370/332 |

(Continued)

FOREIGN PATENT DOCUMENTS

| CN | 101222759 A | 7/2008 |
|---|---|---|
| CN | 101572921 A | 11/2009 |

(Continued)

OTHER PUBLICATIONS

Extended European search report received for EP Patent Application No. 16771294.2, dated Dec. 19, 2018, 18 pages.

(Continued)

*Primary Examiner* — Duc T Duong
(74) *Attorney, Agent, or Firm* — Xsensus LLP

(57) ABSTRACT

Provided are a device and method for a user equipment side and a base station side in wireless communication. The device (100) for a user equipment side comprises: an information acquisition unit (101), configured to obtain cell special dynamic offset information for wireless resource management of a serving cell and/or adjacent cell of a user equipment, wherein cell special dynamic offset relates to a transmission capacity of a corresponding cell, and the transmission capacity comprises at least one of cell multi-antenna transmission performance gain and a load condition; a measurement unit (102), configured to measure a reference signal of the serving cell and the adjacent cell; and a cell reselection/measurement reporting unit (103), configured to perform cell reselection or measurement reporting based on the cell special dynamic offset and a measurement result for the serving cell and the adjacent cell according to a connection state of the user equipment.

18 Claims, 7 Drawing Sheets

(51) Int. Cl.
*H04W 36/16* (2009.01)
*H04W 36/18* (2009.01)
*H04W 36/36* (2009.01)
*H04W 24/00* (2009.01)
*H04W 36/30* (2009.01)
*H04W 76/27* (2018.01)
*H04W 88/02* (2009.01)
*H04W 88/08* (2009.01)

(56) References Cited

U.S. PATENT DOCUMENTS

| | | | |
|---|---|---|---|
| 2009/0270104 A1* | 10/2009 | Du | H04W 48/02 455/436 |
| 2010/0067496 A1* | 3/2010 | Choi | H04W 52/54 370/336 |
| 2011/0026492 A1* | 2/2011 | Frenger | H04W 36/34 370/331 |
| 2012/0307715 A1* | 12/2012 | Maeda | H04B 7/15507 370/315 |
| 2013/0028161 A1* | 1/2013 | Maeda | H04W 72/0406 370/311 |
| 2013/0058244 A1 | 3/2013 | Huang | |
| 2013/0183979 A1* | 7/2013 | Chen | H04W 36/30 455/436 |
| 2013/0201853 A1 | 8/2013 | Perets et al. | |
| 2013/0210434 A1* | 8/2013 | Dimou | H04W 36/36 455/452.2 |
| 2013/0223235 A1* | 8/2013 | Hu | H04W 36/30 370/242 |
| 2013/0225178 A1* | 8/2013 | Kojima | H04W 36/00835 455/437 |
| 2014/0004862 A1* | 1/2014 | Ekemark | H04W 36/22 455/443 |
| 2014/0031047 A1* | 1/2014 | Jovanovic | H04W 24/02 455/446 |
| 2014/0050089 A1 | 2/2014 | Zhang et al. | |
| 2014/0112310 A1 | 4/2014 | Teyeb et al. | |
| 2014/0128074 A1* | 5/2014 | Vangala | H04W 36/22 455/436 |
| 2014/0328327 A1* | 11/2014 | Xiao | H04B 17/336 370/332 |
| 2014/0334459 A1* | 11/2014 | Larsson | H04B 7/0413 370/336 |
| 2015/0009887 A1* | 1/2015 | Chen | H04W 48/12 370/312 |
| 2015/0079989 A1* | 3/2015 | Tambaram Kailasam | H04W 36/0088 455/436 |
| 2015/0156694 A1* | 6/2015 | Froberg Olsson | H04W 36/30 455/436 |
| 2015/0189583 A1 | 7/2015 | Tamaki et al. | |
| 2015/0208280 A1* | 7/2015 | Lorca Hernando | H04W 28/08 370/235 |
| 2015/0222345 A1* | 8/2015 | Chapman | H04W 36/30 370/332 |
| 2015/0319661 A1 | 11/2015 | Jung et al. | |
| 2015/0373601 A1* | 12/2015 | Benjebbour | H04W 16/32 370/252 |
| 2016/0029275 A1* | 1/2016 | Guo | H04W 36/0016 455/436 |
| 2016/0119850 A1* | 4/2016 | Kimura | H04W 24/10 370/332 |
| 2016/0157140 A1* | 6/2016 | Tiwari | H04W 36/0055 455/436 |
| 2016/0226612 A1* | 8/2016 | Axmon | H04J 11/0086 |
| 2016/0330659 A1* | 11/2016 | Zhu | H04W 36/0077 |
| 2016/0353342 A1* | 12/2016 | Futaki | H04L 12/189 |
| 2016/0360537 A1* | 12/2016 | Palenius | H04W 72/02 |
| 2017/0171786 A1* | 6/2017 | Mochizuki | H04W 36/04 |
| 2017/0318473 A1 | 11/2017 | Futaki | |
| 2018/0034525 A1* | 2/2018 | Park | H04L 5/0048 |

FOREIGN PATENT DOCUMENTS

| | | |
|---|---|---|
| CN | 103167557 A | 6/2013 |
| CN | 103369603 A | 10/2013 |
| CN | 103501511 A | 1/2014 |
| JP | 2013-179406 A | 9/2013 |
| JP | 2014-155093 A | 8/2014 |
| JP | 2014-535229 A | 12/2014 |
| JP | 2015-037235 A | 2/2015 |
| WO | 2013/115696 A1 | 8/2013 |
| WO | 2014/003962 A1 | 1/2014 |
| WO | 2014/016280 A1 | 1/2014 |
| WO | 2014/025196 A1 | 2/2014 |
| WO | 2014/083664 A1 | 6/2014 |
| WO | 2014/125885 A1 | 8/2014 |

OTHER PUBLICATIONS

Alcatel-Lucent: "Intra-frequency measurement reporting events Document: Discussion & decision", 3GPP Draft; R2-074962 TDOC Handover Events, 3rd Generation Partnership Project (3GPP), Mobile Competence Centre; France, vol. RAN WG2, no. Jeju;Nov. 12, 2007 (Nov. 12, 2007), XP050137453, [retrieved on Nov. 12, 2007] * p. 3 *.
Partial Supplementary European Search Report dated Oct. 18, 2018 in European Application No. 16771294.2-1214.
International Search Report dated Jun. 28, 2016 in PCT/CN2016/076959 filed Mar. 22, 2016.
Office Action dated Jul. 28, 2020, in corresponding Chinese patent Application No. 201510151725.5, 8 pages.
Office Action dated Jan. 5, 2021, in corresponding Japanese patent Application No. 2017-537936, 6 pages.

* cited by examiner

DEVICE AND METHOD FOR USER EQUIPMENT SIDE AND BASE STATION SIDE IN WIRELESS COMMUNICATION

CROSS-REFERENCE TO RELATED APPLICATIONS

The present application is a continuation of U.S. application Ser. No. 15/556,339, filed Sep. 7, 2017, which is based on PCT filing PCT/CN2016/076959, filed Mar. 22, 2016, which claims priority to CN 201510151725.5, filed Apr. 1, 2015, the entire contents of each are incorporated herein by reference.

FIELD OF THE INVENTION

The present disclosure generally relates to the technical field of wireless communications, in particular to radio resource management in the wireless communications, and more particularly to a device and a method for a user equipment side in wireless communications, and a device and a method for a base station side in wireless communications.

BACKGROUND OF THE INVENTION

In a wireless communication system such as a LTE system, various radio resource management operations such as cell reselection, cell handover, carrier aggregation and dual-connection are performed based on a measurement result for a channel. Specifically, a user equipment in a RRC idle state in the current LTE communication system measures intensities of signals of a serving cell and a neighboring cell, to perform a cell reselection operation. The serving cell of the user equipment does not instruct the neighboring cell in system information thereof and the user equipment itself performs cell search and measurement, so that the neighboring cell is detected. The user equipment starts measuring the neighboring cell based on the S criterion, and performs cell reselection judgment based on the R criterion. Dynamic characteristics of respective cells including the serving cell are not taken into consideration in the current R criterion, therefore, a cell reselection result based on the current criterion may be not ideal in a scenario where service load balance is performed for example in an enhanced small cell related to a massive MIMO.

In addition, in a current RRM measurement mechanism, the above dynamic characteristics of the cells are not taken into consideration either in report triggering determination of the user equipment for the measurement result. Therefore, for example, a neighboring cell suitable to be used as a candidate cell may fail to be reported on the side of the user equipment, and a resource management decision for example handover performed by the base station based on the measurement report result of the user equipment may be unreasonable.

SUMMARY OF THE INVENTION

In the following, an overview of the present disclosure is given simply to provide basic understanding to some aspects of the present disclosure. However, it should be understood that this overview is not an exhaustive overview of the present disclosure. It is not intended to determine a critical part or an important part of the present disclosure, nor to limit the scope of the present disclosure. An object of the overview is only to give some concepts about the present disclosure in a simplified manner, which serves as a preface of a more detailed description described later.

According to an aspect of the present application, a device for a user equipment side in wireless communications is provided, and the device includes: an information acquiring unit, configured to acquire information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability includes at least one of a multi-antenna gain of the cell and a load condition of the cell; a measuring unit, configured to measure reference signals of the serving cell and the neighboring cell; and a cell reselection/measurement reporting unit, configured to perform, based on the cell specific dynamic offset and measurement results on the serving cell and the neighboring cell, cell reselection or measurement reporting, according to a connection state of the user equipment.

A device for a base station side in wireless communications is provided according to another aspect of the present disclosure, and the device includes: an instruction generating unit, configured to generate instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability includes at least one of a multi-antenna gain of the cell and a load condition of the cell; and a radio resource management unit, configured to perform, based on the cell specific dynamic offset, radio resource management on the user equipment.

A device for a base station side in wireless communications is provided according to yet another aspect of the present disclosure, and the device includes: a communication unit, configured to interchange, with a neighboring base station, information of a cell specific dynamic offset of a respective serving cell used for radio resource management, wherein the cell specific dynamic offset is related to transmission capability of a respective cell, and the transmission capability includes at least one of a multi-antenna gain of the cell and a load condition of the cell; and a radio resource management unit, configured to perform, based on the information of the cell specific dynamic offset of the serving cell of the base station and the cell specific dynamic offset of the serving cell of the neighboring base station, radio resource management on a user equipment of the base station.

A method for a user equipment side in wireless communications is provided according to another aspect of the present disclosure, and the method includes: acquiring information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability includes at least one of a multi-antenna gain of the cell and a load condition of the cell; measuring reference signals of the serving cell and the neighboring cell; performing, based on the cell specific dynamic offset and measurement results on the serving cell and the neighboring cell, cell reselection or measurement reporting, according to a connection state of the user equipment.

A method for a base station side in wireless communications is provided according to another aspect of the present disclosure, the method includes: generating instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability includes at least one of a multi-antenna gain of the cell and a load condition of the cell; and performing, based on the cell specific dynamic offset, radio resource management on the user equipment.

A method for a base station side in wireless communications is provided according to an aspect of the present disclosure, and the method includes: interchanging, with a neighboring base station, information of a cell specific dynamic offset of a respective serving cell used for radio resource management, wherein the cell specific dynamic offset is related to transmission capability of a respective cell, and the transmission capability includes at least one of a multi-antenna gain of the cell and a load condition of the cell; and performing, based on the information of the cell specific dynamic offset of the serving cell of the base station and the cell specific dynamic offset of the serving cell of the neighboring base station, radio resource management on a user equipment of the base station.

A device for a user equipment side in wireless communications is further provided according to another aspect of the present disclosure, and the device includes one or more processors configured to: acquire information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability includes at least one of a multi-antenna gain of the cell and a load condition of the cell; measure reference signals of the serving cell and the neighboring cell; and perform, based on the cell specific dynamic offset and measurement results on the serving cell and the neighboring cell, cell reselection or measurement reporting, according to a connection state of the user equipment.

A device for a base station side in wireless communications is provided according to another aspect of the present disclosure, the device includes one or more processors configured to: generate instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability includes at least one of a multi-antenna gain of the cell and a load condition of the cell; and perform, based on the cell specific dynamic offset, radio resource management on the user equipment.

A device for a base station side in wireless communications is provided according to another aspect of the present disclosure, and the device includes one or more processors configured to: interchange, with a neighboring base station, information of a cell specific dynamic offset of a respective serving cell used for radio resource management, wherein the cell specific dynamic offset is related to transmission capability of a respective cell, and the transmission capability includes at least one of a multi-antenna gain of the cell and a load condition of the cell; and perform, based on the information of the cell specific dynamic offset of the serving cell of the base station and the cell specific dynamic offset of the serving cell of the neighboring base station, radio resource management on a user equipment of the base station.

Computer program codes and a computer program product for implementing the method for the user equipment side in wireless communications and the method for the base station side in wireless communications described above, and a computer readable storage medium on which the computer program codes for implementing the method for the user equipment side in wireless communications and the method for the base station side in wireless communications described above are recorded are further provided according to other aspects of the present disclosure.

The information of the cell specific dynamic offset is taken into account in cell reselection/measurement report in the device and the method according to the present disclosure, thereby allowing selecting a cell with better actual transmission performance.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
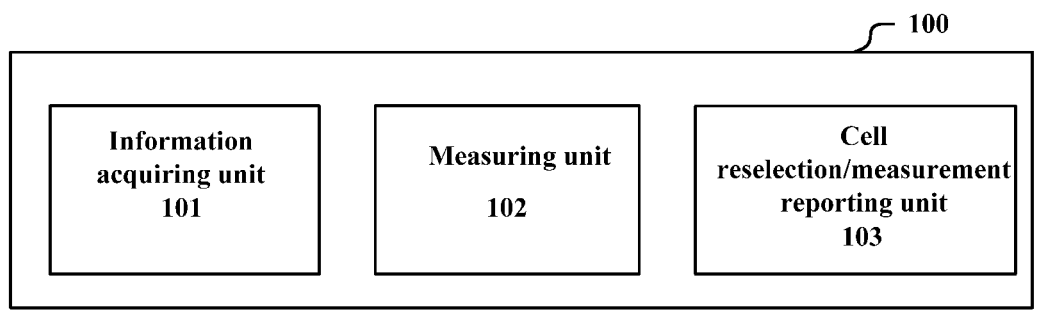
FIG. 1 is a structural block diagram showing a device for a user equipment side in wireless communications according to an embodiment of the present disclosure.

FIG. 1 is a structural block diagram showing a device 100 for a user equipment side in wireless communications according to an embodiment of the present disclosure, and the device 100 includes: an information acquiring unit 101, configured to acquire information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability comprises at least one of a multi-antenna transmission performance gain of the cell and a load condition of the cell; a measuring unit 102, configured to measure reference signals of the serving cell and the neighboring cell; and a cell reselection/measurement reporting unit 103, configured to perform, based on the cell specific dynamic offset and measurement results on the serving cell and the neighboring cell, cell reselection or measurement reporting, according to a connection state of the user equipment. In an existing LTE system, a measurement report value of the user equipment for a radio resource management operation such as cell handover is only with respect to a channel corresponding to a single antenna port, and a multi-antenna transmission performance gain of the base station of the cell is neglected. Therefore, the following situation may occur: the user equipment accesses to a cell actually having a poor performance due to a small multi-antenna transmission performance gain rather than a cell actually having a good performance due to a great multi-antenna transmission performance gain.

In the device 100, the information acquiring unit 101 acquires the information of the cell specific dynamic offset of the serving cell of the user equipment and/or the cell specific dynamic offset of the neighboring cell of the user equipment, which is used for radio resource management. The cell reselection/measurement report unit 103 performs the cell reselection or the measurement report with the information of the cell specific dynamic offset, thereby more accurately determining a cell having better actual performance. The cell specific dynamic offset may change dynamically due to being specific to the cell, and different cells generally have different dynamic offset values.

Specifically, the information acquiring unit 101 can acquire the information of the cell specific dynamic offset of both the serving cell (the current cell) and the neighboring cell, or can acquire the information of the cell specific dynamic offset of only one of the serving cell and the neighboring cell. For example, in measurement report event configuration for cell handover, only cell specific dynamic offset of the neighboring cell can be acquired, since the base station can naturally know a specific situation of the current cell and takes the situation of the current cell into account when making radio resource management decision. In cell reselection, for example, the information acquiring unit 101 can only acquire the cell specific dynamic offset of the current cell, for example, and the cell reselection/measurement report unit 103 can add the measurement result of the current cell with the cell specific dynamic offset, and compare the result with the measurement result of other cells, so as to determine a cell to be accessed, so that frequent cell reselection can be avoided.

The cell reselection/measurement report unit 103 performs cell reselection or measurement report based on the cell specific dynamic offset and the measurement result of the measuring unit 102, according to a connection state of the user equipment such as whether the user equipment is in a radio resource control (RRC) connected state. For example, measurement report is performed in the RRC connected state, and cell reselection is performed in a RRC unconnected (idle) state.

In an example, the measurement result of the measuring unit 102 includes a measurement value related to at least one of reference signal receiving power (RSRP) and reference signal receiving quality (RSRQ).

For example, the cell reselection/measurement report unit 103 may be configured to rank measured cells based on the information of the cell specific dynamic offset and the measurement results described above, and determine a cell to be accessed based on a ranking result. As an example, the cell reselection/measurement report unit 103 can combine the information of the cell specific dynamic offset of each cell with a measurement result of the cell to acquire transmission performance of the cell, and determine a cell with the best transmission performance as the cell to be accessed. Alternatively, the cell reselection/measurement report unit 103 can determine a cell with the best transmission performance and where signaling transmission can be ensured as a cell to be accessed, an such an example is suitable for a situation where some signaling, for example control signaling such as PDCCH signaling would not be subjected to multi-antenna processing and thus would not benefit from the multi-antenna gain. Therefore, it is required that receiving quality of the user equipment for the signaling achieves a certain level, for example, the measurement result itself is required to achieve a certain threshold.

For example, in the cell reselection, the user equipment can rank the measured cells based on the acquired information of the cell specific dynamic offset and the measurement results, and select a cell with the best transmission performance to be accessed. It can be understood that an existing cell reselection rule can be further combined based on the cell reselection idea of the present disclosure, which is not limited in the present disclosure.

In a specific example, the user equipment measures reference signals of the serving cell and the neighboring cell, and acquires measurement values $Q_{meas,s}$ and $Q_{meas,n}$ represented by RSRP, and ranks the cells based on a cell reselection parameter including the cell specific dynamic offset notified by the base station according to the equations below:

$$R_{s'} = Q_{meas,s} + Q_{Hyst} - Q_{offsettemp} + Q_{offsetdyn,s} \quad (1)$$

$$R_{n'} = Q_{meas,s} - Q_{offset} - Q_{offsettemp} + Q_{offsetdyn,n} \quad (2)$$

Specifically, $R_{s'}$ represents a R reference value of the serving cell for participating in cell ranking. $R_{n'}$ represents a R reference value of the neighboring cell for participating in cell ranking, $Q_{offsetdyn,s}$ represents a cell specific dynamic offset of the serving cell, and $Q_{offsetdyn,n}$ represents a cell specific dynamic offset of the neighboring cell. In addition, as specified in technology standards TS36.331 and TS25.331 of 3GPP, $Q_{Hyst}$ represents a hysteresis value of a ranking rule, $Q_{offset}$ represents an offset or a frequency specific offset between the serving cell and the neighboring cell of OAM static configuration based on whether the two cells are intra-frequency cells or inter-frequency cells, respectively, $Q_{offsettemp}$ represents a temporary offset value common for all cells. The user equipment ranks all cells meeting the S criterion based on the R reference values calculated according to the equation above, and selects an optimal cell ranked in the first place to execute the cell reselection operation in some examples.

In another optional example, the user equipment calculates reference values $R_s$ and $R_n$ according to the R criterion in existing standard, for example, according to the equations below:

$$R_s = Q_{meas,s} + Q_{Hyst} - Q_{offsettemp} \quad (3)$$

$$R_n = Q_{meas,n} - Q_{offset} - Q_{offsettemp} \quad (4)$$

Specifically, the same symbol in equations (3) and (4) has the same meaning as that in equations (1) and (2). Then, the user equipment selects multiple candidate neighboring cells having a reference value $R_n$ greater than $R_s$ of the serving cell, calculates $R_{n'}$ for the multiple candidate neighboring cells respectively, and performs cell ranking. A neighboring cell with the greatest $R_{n'}$ value is used as a reselection object, and therefore, a cell with the best actual transmission performance is reselected. In this example, the user equipment does not need to use the cell specific dynamic offset $Q_{offsetdyn,s}$ of the serving cell, and therefore, it is possible not to set the cell specific dynamic offset value to reduce signaling overhead.

Other combined or deformed way can be designed by those skilled in the art based on the conventional technology and the above example, for example, the user equipment receives, from the base station, only a difference between $Q_{offsetdyn,s}$ and $Q_{offsetdyn,n}$ as the cell specific dynamic offset of the corresponding neighboring cell, and calculates $R_{n'}$ with the difference between $Q_{offsetdyn,s}$ and $Q_{offsetdyn,n}$ while ranking the cells in combination with $R_s$, which are not enumerated here.

Specifically, the information acquiring unit 101 can acquire the information of the cell specific dynamic offset based on system information or historical information recorded in the user equipment. For example, the system information is acquired through a broadcast channel (for example BCCH), and the historical information refers to for example the information of the cell specific dynamic offset of a certain cell and the neighboring cell acquired from the cell when the user equipment accesses to the cell previously. Alternatively, the historical information may be the information of the cell specific dynamic offset of a cell recorded every time the user equipment accesses to the cell. The information acquiring unit 101 uses the system information or the historical information as the information of the cell specific dynamic offset of the neighboring cell in the case that the user equipment is in a RRC idle state, to perform for example cell reselection.

In addition, the information acquiring unit 101 acquires the information of the cell specific dynamic offset of the serving cell and the cell specific dynamic offset of the neighboring cell by receiving a RRC signaling from the base station of the serving cell. For example, the information acquiring unit 101 acquires an ID of the neighboring cell and the corresponding information of the cell specific dynamic offset when the user equipment establishes a RRC connection with the serving cell, for example, acquires the information of the cell specific dynamic offset of each cell in an information element SystemInformationBlockType4 and/or SystemInformationBlockType5 of a RRC message. The information of the cell specific dynamic offset of the neighboring cell measured currently is determined with the previously recorded information of the cell specific dynamic offset of the neighboring cell and the acquired ID of the neighboring cell in the RRC idle state.

The multi-antenna transmission performance gain in the above may include for example a pre-coding gain and/or a beam-forming gain of the cell. In addition, in an example, the cell specific dynamic offset is also related to a load of the cell, specifically, the greater the load is, the smaller the vale of the offset is.

Second Embodiment

An example of applying the device for a user equipment side in wireless communications according to the present disclosure to measurement report is described below. Generally, a base station performs radio resource management (RRM) measurement configuration on the user equipment through high-layer signaling, and makes, based on RRM measurement results on a neighboring cell and the current cell fed back by the user equipment according to the configuration, a radio resource management decision such as cell handover, dual-connection starting or adjusting, carrier aggregation starting or carrier combination adjusting.

In the embodiment, the information acquiring unit 101 is configured to acquire measurement configuration information from a serving cell of the user equipment in the case that a connection state of radio resource control (RRC) of the user equipment is connected. The measurement configuration information contains for example a cell specific dynamic offset and measurement report configuration about a report triggering event which takes the cell specific dynamic offset into account.

It should be noted that the report triggering event refers to an event newly defined in the present disclosure which takes the cell specific dynamic offset into account, which will be described in detail hereinafter. In other words, the information acquiring unit 101 acquires information on the measurement report configuration including a triggering condition and so on for the report triggering event which takes the cell specific dynamic offset into account and the related information of the cell specific dynamic offset from the serving cell (the base station). For example, the above measurement configuration information containing the information of the cell specific dynamic offset may be contained in a RRC signaling, specifically in a MeasObjectEUTRA (for example in CellsToAddMod) of the RRC signaling, and the information related to the measurement report configuration may be contained in measconfig IE.

As an example, the cell reselection/measurement report unit 103 may include: a measurement report triggering module, configured to trigger a measurement report based at least on the cell specific dynamic offset, the measurement result and the measurement report configuration. For example, in the case that the cell specific dynamic offset and the measurement result for one or more cells meet a measurement report event defined in the measurement report configuration, the measurement report triggering module incorporates an ID of the cell into the measurement report and triggers the measurement report, for example, reports a neighboring cell with the best transmission performance to the base station through the measurement report, to be switched to the neighboring cell.

As another example, the cell reselection/measurement report unit 103 may include a measurement report generating module, configured to contain a measurement result of the neighboring cell meeting the report triggering event which takes the cell specific dynamic offset into account in the measurement report. In this case, rather than performing determination of a target cell on the side of the user equipment, the user equipment reports the measurement result to the base station. For example, the target cell is selected by the base station to perform a management operation such as cell handover, dual-connection, carrier aggregation or the like.

Third Embodiment

An example of applying a device for a user equipment side in wireless communications according to present disclosure to cell reselection is described below. In the example, the user equipment is in a RRC idle state, and the information acquiring unit 101 can acquire the information of the cell specific dynamic offset for example via the system information or the historical information described above. The cell reselection/measurement report unit 103 can determine, based on the information of the cell specific dynamic offset and the measurement result of the measuring unit 102, a cell with the best transmission performance as a cell to be accessed, for example, determine by a cell ranking way in the first embodiment.

Figure 2:
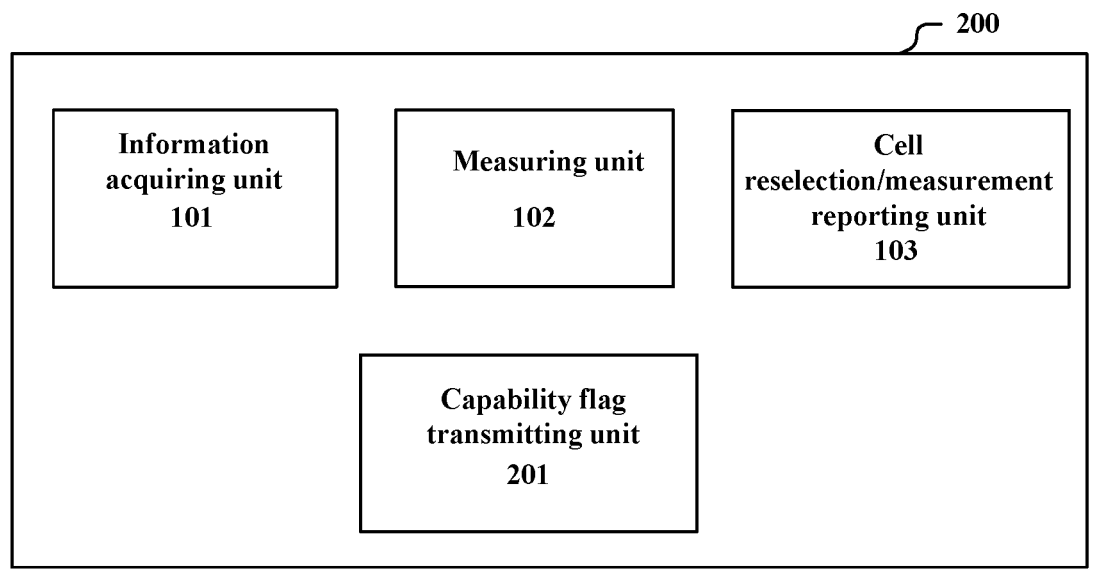
FIG. 2 is a structural block diagram showing a device for a user equipment side in wireless communications according to an embodiment of the present disclosure.

In addition, as shown in FIG. 2, besides the components of the device 100 described with reference to FIG. 1, the device 200 according to the embodiment may further include a capability flag transmitting unit 201, configured to transmit, after the cell reselection is completed, an equipment capability flag indicating that the cell specific dynamic offset is taken into account when determining to a target cell of the cell reselection. In this way, the target cell may preferably configure a multi-antenna transmission scheme for the user equipment.

For example, the capability flag transmitting unit 201 may be configured to transmit the equipment capability flag in the RRC signaling. As another example, the capability flag transmitting unit 201 may be configured to transmit the equipment capability flag in random access request signaling.

The device 100 and the device 200 described above take the information of the cell specific dynamic offset into account when performing the cell reselection or measurement report, thereby accurately reflecting actual performance of the cell and facilitating more accurate decision-making.

Fourth Embodiment

Figure 3:
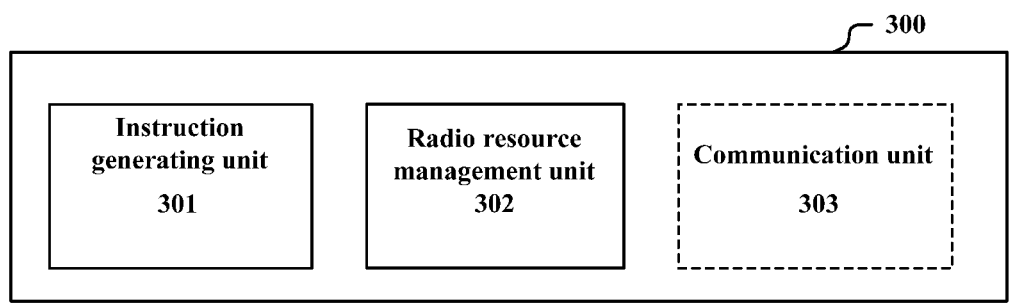
FIG. 3 is a structural block diagram showing a device for a base station side in wireless communications according to an embodiment of the present disclosure.

FIG. 3 is a structural block diagram showing a device 300 for a base station side in wireless communications according to an embodiment of the present disclosure, and the device 300 includes: an instruction generating unit 301, configured to generate instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability includes at least one of a multi-antenna transmission performance gain of the cell and a load condition of the cell, and a radio resource management unit 302, configured to perform radio resource management on the user equipment based on the cell specific dynamic offset.

As described above, the multi-antenna transmission performance gain may include a pre-coding gain and/or a beam-forming gain of the cell. The cell specific dynamic offset may also be related to a load of the cell. The greater the load is, the smaller a value of the offset is. Specifically, the multi-antenna transmission performance gain of the cell and the load of the cell change dynamically based on an operating state of the corresponding cell, for example, the multi-antenna transmission performance of a cell where multiple antennas are deployed may change with the number of users served currently.

In the device 300, the instruction generating unit 301 generates instruction information containing the cell specific dynamic offset, and the radio resource management unit 302 performs radio resource management such as cell handover, dual-connection and carrier aggregation based on the cell specific dynamic offset.

As shown in a dash-line block of FIG. 3, the device 300 may further include a communication unit 303 configured to transmit the instruction information to the user equipment served by the base station, and receive an access request and a measurement report from the user equipment.

In an example, the instruction generating unit 301 contains the cell specific dynamic offset in system information, and the communication unit 303 transmits the system information containing the cell specific dynamic offset through a broadcast channel. For example, the system information is SIB, a dynamic offset item of the current cell (q-OffsetDyn) can be added in cellReselectionInfoCommon in SystemInformationBlockType3, and a dynamic offset item of a intra-frequency neighboring cell (q-OffsetDyn) can be added in IntraFreqNeighCellInfo in SystemInformationBlockType4, and a dynamic offset item of a inter-frequency neighboring cell (q-OffsetDyn) can be added in InterFreqNeighCellInfo in SystemInformationBlockType5. For example, in the case that the user equipment in a RRC idle state, it can receive the system information so as to perform an operation such as cell reselection.

In another example, in the case that the user equipment is already in a RRC connected state, the instruction generating unit 301 contains the cell specific dynamic offset in a RRC signaling, and the communication unit 303 transmits the RRC signaling containing the cell specific dynamic offset through a data channel. As described above, for example, the cell specific dynamic offset may be contained in MeasObjectEUTRA (for example in CellsToAddMod) of the RRC signaling. In addition, the cell specific dynamic offset may be contained in a system information block of the RRC, specifically, in the SystemInformationBlockType3, the SystemInformationBlockType4 or the SystemInformationBlockType5 described above.

In addition, the instruction generating unit 301 may also contain the cell specific dynamic offset and measurement report configuration about a report triggering event which takes the cell specific dynamic offset into account in the measurement configuration information of the RRC signaling, for measurement report of the user equipment. That is, the transmitted RRC signaling further includes measurement report configuration for the user equipment. As described above, the information of the measurement report configuration may be contained in measconfig IE. In addition, the measconfig may further include a list of cells which the base station expects to be measured by the user equipment, parameters of respective measurement report events and the like. When the user equipment completes measuring the cells according to a requirement of the measurement configuration, it determines, based on a parameter of the event, whether the measurement result meets a corresponding report triggering event, and an ID of the cell, an ID of the report triggering event met by the measurement result and/or the particular measurement result are reported in the case that the measurement result meets the report triggering event.

As an example, the radio resource management unit 302 determines the measurement result on the neighboring cell contained in the measurement report from the user equipment, and determines, based on the measurement result on the neighboring cell and the cell specific dynamic offset corresponding to the neighboring cell, a target access cell for the user equipment. In this example, the target access cell is determined on the side of the base station. In addition, the radio resource management unit 302 can determine, based on the report triggering event corresponding to the measurement result, the target access cell as at least one of a switch target cell, a dual-connection target cell or a carrier aggregation target cell of the user equipment. For example, a new report triggering event for handover, dual-connection and carrier aggregation, which takes the cell specific dynamic offset into account may be set, and a unique ID is allocated to the new report triggering event.

It should be noted that the report triggering event described here is an event newly defined in the present disclosure which takes the cell specific dynamic offset into account. For example, new events A7 and A8 can be defined. Specifically, A7 includes two entering conditions:

$$Mn+Ofn+Ocn+Odn-Hys>Mp+Ofp+Ocp+Ods+Off \quad (5)$$

$$Mn+Ofn+Ocn-Hys>\text{first threshold} \quad (6)$$

where Mn is a measurement result on the neighboring cell without taking the offset into account, Ofn is a frequency specific offset for a frequency of the neighboring cell, Ocn is a static neighboring cell specific offset by OAM assignment, Odn is a cell specific dynamic offset of the neighboring cell introduced in the present disclosure, Hys is a hysteresis parameter of the event, Mp is a measurement result on a primary cell without taking the offset into account, Ofp is a frequency specific offset of a primary frequency; Ocp is a static primary cell specific offset by OAM assignment, and Ods is a cell specific dynamic offset of the serving cell introduced in the present disclosure, Of is an offset parameter for the event, and the first threshold may be set for example in the measconfig. In other words, in the case that the cell meets the two conditions of the event A7, an ID of the cell and an event ID of A7 and/or the measurement result can be reported. Specifically, the condition (6) ensures a signal quality of transmission of the neighboring cell, for example, which transmission is not subjected to the multi-antenna processing and thus fails to benefit from the multi-antenna transmission performance gain.

In addition, a leaving condition for the event A7 is also set based on the idea of the present disclosure in a preferable example:

$$Mn+Ofn+Ocn+Odn-Hys<Mp+Ofp+Ocp+Ods+Off \quad (7)$$

$$Mn+Ofn+Ocn-Hys<0 \quad (8),$$

By means of this, the user equipment is configured to report a corresponding measurement result by triggering event A7 configuration based on the above measurement report, and the base station determines whether to perform the switch of the primary cell Pcell/PScell and selection of a switch target cell based on the measurement report under this event.

Event A8 includes two entering conditions as follows:

$$Mn+Ocn+Odn-Hys>Ms+Ocs+Ods+Off \quad (9)$$

$$Mn+Ocn-Hys>\text{second threshold} \quad (10)$$

In addition, a leaving condition for the event A8 is set according to the idea of the present disclosure in the preferable example:

$$Mn+Ocn+Odn-Hys<Ms+Ocs+Ods+Off \quad (11)$$

$$Mn+Ocn-Hys<0 \quad (12)$$

where the same symbol in these equations has the same meaning as that in equations (5) and (6), and the second threshold may also be set in measconfig for example. Similarly, the user equipment is configured to report a corresponding measurement result by triggering event A8 configuration based on the above measurement report, for example, can report an ID of the cell, an event ID of A8 and/or the measurement result. The base station determines, based on the measurement report under the event, whether to add, delete or replace a secondary cell Scell.

Other combined or deformed way can be designed by those skilled in the art based on the conventional technology and the above example, for example, the user equipment receives only a difference between Qdn and Qds as the cell specific dynamic offset of the corresponding neighboring cell from the base station, which is not enumerated here.

In addition, in the case that the device 300 operates as a target access base station of the user equipment, the communication unit 303 may be further configured to receive, from the user equipment, an equipment capability flag indicating that the user equipment has taken the cell specific dynamic offset into account. In the case that the equipment capability flag indicates that the access request has taken the cell specific dynamic offset into account, the radio resource management unit 302 is configured to preferentially determine a multi-antenna transmission scheme for the user equipment.

For example, after the user equipment completes cell reselection, the above equipment capability flag is transmitted to a communication unit 303 of a selected cell. In subsequent transmission, the radio resource management unit 302 determines a multi-antenna transmission scheme for the user equipment preferentially, since the equipment capability flag indicates that the multi-antenna transmission performance gain of the cell is taken into account when selecting the cell.

The device 300 according to the embodiment implements radio resource management based on the cell specific dynamic offset, and improves resource utilization efficiency.

Fifth Embodiment

Figure 4:
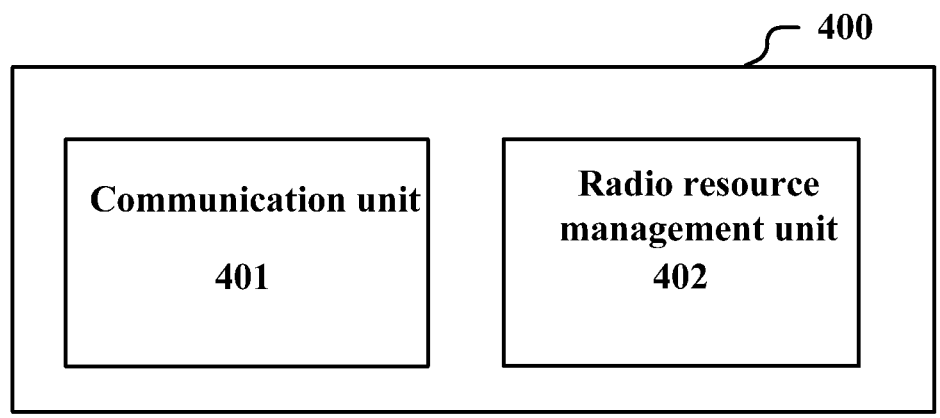
FIG. 4 is a structural block diagram showing a device for a base station side in wireless communications according to an embodiment of the present disclosure.

FIG. 4 is a structural block diagram showing a device 400 for a base station side in wireless communications according to an embodiment of the present disclosure, and the device 400 includes: a communication unit 401, configured to interchange, with a neighboring base station, information of a cell specific dynamic offset of a respective serving cell used for radio resource management, wherein the cell specific dynamic offset is related to transmission capability of a respective cell, and the transmission capability comprises at least one of a multi-antenna transmission performance gain of the cell and a load condition of the cell; and a radio resource management unit 402 configured to perform, based on the information of the cell specific dynamic offset of the serving cell of the base station and the cell specific dynamic offset of the serving cell of the neighboring base station, radio resource management on a user equipment of the base station.

In the device 400, the communication unit 401 enables interchange of the information of the cell specific dynamic offset of the respective serving cell with each other between neighboring base stations, so that the base station can provide the information of the cell specific dynamic offset of the cells of the base station itself and the neighboring base station to a user equipment of a cell served by the base station. Alternatively, the base station performs radio resource management with the information of the cell specific dynamic offset. For example, the cell specific dynamic offset of each cell in the present disclosure changes dynamically based on an operating state of the cell, for example, the multi-antenna transmission performance gain can change with the number of the served users. Beam-forming can be used to improve transmission quality in the case that the number of users is small, and the transmission service of beam-forming can not be provided in the case that the number of users is great. The load of the cell also changes according to a particular transmission service state of the cell. Therefore, in the present disclosure, it is designed that the neighboring base stations directly interchange the information of the cell specific dynamic offsets with each other, thereby ensuring real time of the information, and improving accuracy of the radio resource management compared with a current way of acquiring a static characteristic of the neighboring cell by OAM configuration.

In an example of the present disclosure, rather than notifying the user equipment of the information of the cell specific dynamic offset, the base station overlaps the cell specific dynamic offset within the base station after receiving the measurement result from the user equipment, to perform the radio resource management operation such as cell handover.

In an example, the communication unit 401 corresponds to an X2 communication interface, and the communication unit 401 interchanges the information of the cell specific dynamic offset via an information bit in Cell Information Item of an X2 message.

The device 400 according to the embodiment can implement radio resource management based on the cell specific dynamic offset, and improve resource utilization efficiency.

Sixth Embodiment

In the process of describing the device for a user equipment side and a base station side in wireless communications in the embodiments described above, obviously, some processing and methods are also disclosed. Hereinafter, an overview of the methods is given without repeating some details disclosed above. However, it should be noted that, although the methods are disclosed in a process of describing the device for a user equipment side and a base station side in wireless communications, the methods do not certainly employ or are not certainly executed by the aforementioned components. For example, the embodiments of the device for a user equipment side and a base station side in wireless communications may be partially or completely implemented with hardware and/or firmware, the method for a user equipment side and a base station side in wireless communications described below may be executed by a computer-executable program completely, although the hardware and/or firmware of the device for a user equipment side and a base station side in wireless communications can also be used in the methods.

Figure 5:
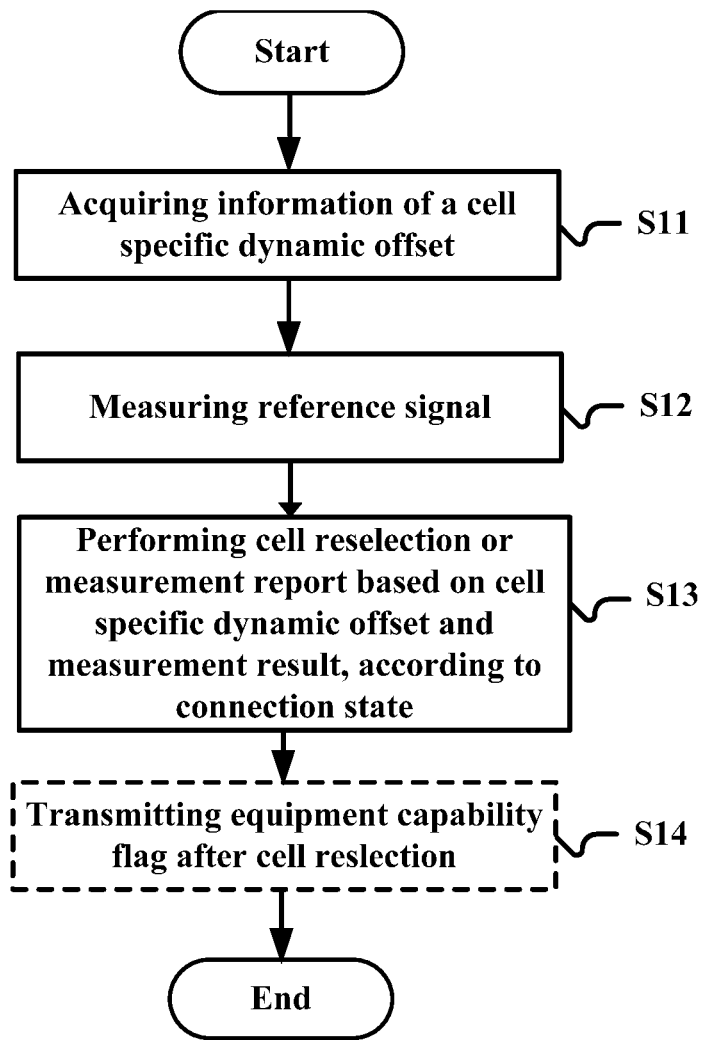
FIG. 5 is a flowchart showing a method for a user equipment side in wireless communications according to an embodiment of the present disclosure.

FIG. 5 is a flowchart showing a method for a user equipment side in wireless communications according to an embodiment of the present disclosure, the method includes: acquiring information of a cell specific dynamic offset of a serving cell of the user equipment and/or a cell specific dynamic offset of a neighboring cell of the user equipment, which is used for radio resource management (S11), wherein the cell specific dynamic offset is related to transmission capability of a corresponding cell, and the transmission capability includes at least one of a multi-antenna transmission performance gain of the cell and a load condition of the cell, measuring reference signals of the serving cell and the neighboring cell (S12), and performing, based on the cell specific dynamic offset and measurement results on the serving cell and the neighboring cell, cell reselection or measurement reporting, according to a connection state of the user equipment (S13).

Specifically, the multi-antenna transmission performance gain includes a pre-coding gain and/or a beam-forming gain of the cell. The cell specific dynamic offset can also be related to load of the cell, specifically, the greater the load is, the smaller a value of the offset is.

In step S11, the information of the cell specific dynamic offset is acquired via system information or historical information recorded in the user equipment. In addition, the information of the cell specific dynamic offset of the serving cell and the cell specific dynamic offset the neighboring cell can also be acquired by receiving RRC signaling from the base station of the serving cell.

The measurement result acquired in step S12 may include a measurement value related to at least one of reference signal receiving power and reference signal receiving quality.

In step S13, the measured cells can be ranked based on the information of the cell specific dynamic offset and the measurement results, and a cell to be accessed is determined based on a ranking result.

In the case that a radio resource control connection state of the user equipment is connected, measurement configuration information from the serving cell of the user equipment is acquired in step S11. The measurement configuration information includes the cell specific dynamic offset and measurement report configuration about a report triggering event which takes the cell specific dynamic offset into account. As described above, multiple new report triggering events which take the cell specific dynamic offset into account may be defined.

As an example, the measurement configuration information containing the information of the cell specific dynamic offset is contained in the RRC signaling.

In step S13, the measurement report is triggered based at least on the cell specific dynamic offset, the measurement result and the measurement report configuration. A measurement result on the neighboring cell which meets the report triggering event which takes the cell specific dynamic offset into account can also be contained in the measurement report.

In the case that cell reselection is performed in step S13, as shown in a dash-line block of FIG. 5, the above method further includes step S14: transmitting, after the cell reselection is completed, an equipment capability flag indicating that the cell specific dynamic offset is taken into account when determining to a target cell of the cell reselection. For example, the equipment capability flag may be transmitted in the RRC signaling.

Figure 6:
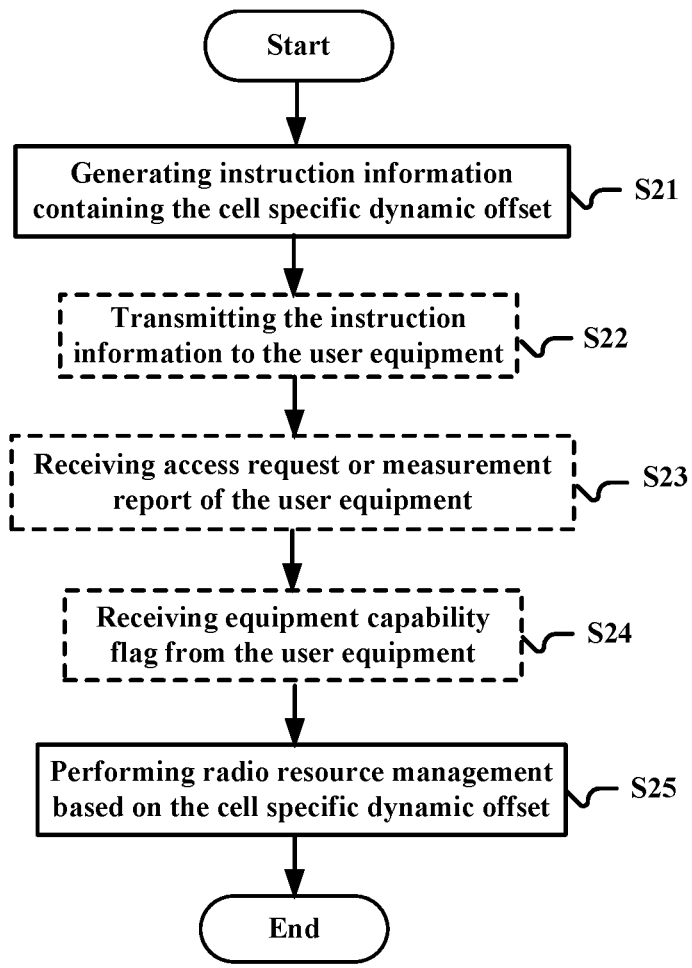
FIG. 6 is a flowchart showing a method for a base station side in wireless communications according to an embodiment of the present disclosure.

FIG. 6 is a flowchart showing a method for a base station side in wireless communications according to an embodiment of the present disclosure, and the method includes: generating instruction information containing a cell specific dynamic offset of a serving cell of the base station and/or a cell specific dynamic offset of a neighboring cell of the base station, which is used for radio resource management (S21), so as to instruct a user equipment served by the base station, wherein the cell specific dynamic offset is related to transmission capability of a corresponding cell, and the transmission capability includes at least one of a multi-antenna transmission performance gain of the cell and a load condition of the cell, and performing, based on the cell specific dynamic offset, radio resource management on the user equipment (S25).

Specifically the multi-antenna transmission performance gain includes a pre-coding gain and/or a beam-forming gain of the cell. The cell specific dynamic offset is further related to the load of the cell, wherein the greater the load is, the small a value of the offset is.

In an example, as shown in a dash-line block of FIG. 6, the above method further includes: transmitting the instruction information to the user equipment served by the base station (S22), and receiving an access request or a measurement report from the user equipment (S23).

For example, the cell specific dynamic offset can be contained in the system information in step S21, and the system information containing the cell specific dynamic offset is transmitted on a broadcast channel in step S22.

In addition, the cell specific dynamic offset can also be contained in a RRC signaling in step S21, and the RRC signaling containing the cell specific dynamic offset is transmitted on a data channel in step S22. For example, the cell specific dynamic offset and measurement report configuration about a report triggering event which takes the cell specific dynamic offset into account can be contained in measurement configuration information of the RRC signaling, for the measurement report of the user equipment.

For example, when performing cell reselection, an access request from the user equipment is received in step S23. In this case, as shown in another dash-line block of FIG. 6, the method may further include step S24: receiving the equipment capability flag indicating that the user equipment has taken the cell specific dynamic offset into account from the user equipment. In the case that the equipment capability flag indicates that the access request has taken the cell specific dynamic offset into account, a multi-antenna transmission scheme is determined for the user equipment preferentially.

In addition, for example, in a scenario such as cell reselection, a measurement report is received from the user equipment in step S23, and the measurement report is reported by the user equipment based on the measurement configuration information. In an example, in step S25, a measurement result on the neighboring cell contained in the measurement report from the user equipment is determined, and a target access cell of the user equipment is determined based on the measurement result on the neighboring cell and the corresponding cell specific dynamic offset.

In addition, the target access cell can also be determined as at least one of a switch target cell, a dual-connection target cell or a carrier aggregation target cell of the user equipment, based on a report triggering event corresponding to the measurement result.

Figure 7:
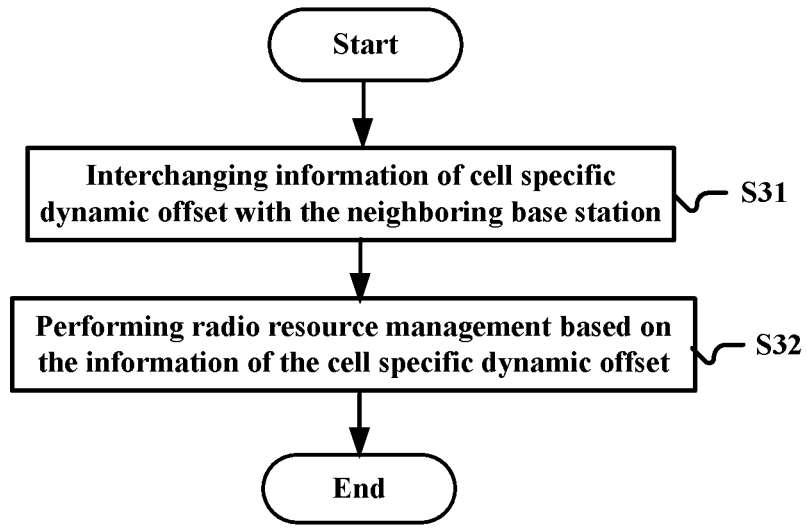
FIG. 7 is a flowchart showing a method for a base station side in wireless communications according to an embodiment of the present disclosure.

FIG. 7 is a flowchart showing a method for a base station side in wireless communications according to another embodiment of the present disclosure, and the method includes: interchanging, with a neighboring base station, information of a cell specific dynamic offset of a respective serving cell used for radio resource management (S31), wherein the cell specific dynamic offset is related to transmission capability of a respective cell, and the transmission capability includes at least one of a multi-antenna transmission performance gain of the cell and a load condition of the cell, and performing, based on the information of the cell specific dynamic offset of the serving cell of the base station and the cell specific dynamic offset of the serving cell of the neighboring base station, radio resource management on a user equipment of the base station (S32).

For example, the information of the cell specific dynamic offset is interchanged via an X2 communication interface in step S31, specifically, for example, the information of the cell specific dynamic offset can be interchanged by an information bit in Cell Information Item of an X2 message.

It is to be noted that, the above methods can be performed separately or in combination with each other, and the detailed descriptions thereof are described in the first to the third embodiments and are not repeatedly described herein.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that for example the information acquiring unit, the measuring unit, the cell reselection/measurement report unit, the instruction generating unit, the radio resource management unit and the like in the device described above may be implemented by one or more processors, and for example the capability flag transmitting unit, the communication unit and so on can be implemented by a circuit element such as an antenna, a filter, a modem, a codec and the like.

Therefore, a device (1) a user equipment side in wireless communications is further provided according to the present disclosure. The device (1) includes: one or more processors configured to: acquire information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability comprises at least one of a multi-antenna transmission performance gain of the cell and a load condition of the cell; measure reference signals of the serving cell and the neighboring cell, and perform, based on the cell specific dynamic offset and measurement results on the serving cell and the neighboring cell, cell reselection or measurement reporting, according to a connection state of the user equipment.

In some examples, the device (1) is a user equipment, and can further include: a transceiver configured to receive the information of the cell specific dynamic offset and transmit a random access request to the neighboring cell or transmit a measurement report to the serving cell.

A device (2) for a base station side in wireless communications is further provided according to the present disclosure. The device (2) includes one or more processors configured to: generate instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability comprises at least one of a multi-antenna transmission performance gain of the cell and a load condition of the cell; and perform, based on the cell specific dynamic offset, radio resource management on the user equipment.

A device (3) for a base station side in wireless communications is further provided according to the present disclosure. The device (3) includes one or more processors configured to: interchange, with a neighboring base station, information of a cell specific dynamic offset of a respective serving cell used for radio resource management, wherein the cell specific dynamic offset is related to transmission capability of a respective cell, and the transmission capability comprises at least one of a multi-antenna transmission performance gain of the cell and a load condition of the cell; and perform, based on the information of the cell specific dynamic offset of the serving cell of the base station and the cell specific dynamic offset of the serving cell of the neighboring base station, radio resource management on a user equipment of the base station.

In some examples, each of the devices (2) and the device (3) is a base station, and can further include a transceiver configured to transmit the information of the cell specific dynamic offset to the user equipment. Details related to the devices (1) to device (3) have been given in the above embodiments, which are not described repeatedly here anymore.

In addition, an electronic apparatus (1) is further provided according to the present disclosure. The electronic apparatus (1) includes circuitry configured to: acquire information of a cell specific dynamic offset of a serving cell of the user equipment and/or a cell specific dynamic offset of a neighboring cell of the user equipment, which is used for radio resource management, wherein the cell specific dynamic offset is related to transmission capability of a corresponding cell, and the transmission capability comprises at least one of a multi-antenna transmission performance gain of the cell and a load condition of the cell; measure reference signals of the serving cell and the neighboring cell; and perform, based on the cell specific dynamic offset and measurement results on the serving cell and the neighboring cell, cell reselection or measurement reporting, according to a connection state of the user equipment.

An electronic apparatus (2) is further provided according to the present disclosure. The electronic apparatus (2) includes circuitry configured to: generate instruction information containing a cell specific dynamic offset of a serving cell of the base station and/or a cell specific dynamic offset of a neighboring cell of the base station, which is used for radio resource management, so as to instruct a user equipment served by the base station, wherein the cell specific dynamic offset is related to transmission capability of a corresponding cell, and the transmission capability comprises at least one of a multi-antenna transmission performance gain of the cell and a load condition of the cell, and perform, based on the cell specific dynamic offset, radio resource management on the user equipment.

An electronic apparatus (3) is also provided according to the present disclosure. The electronic apparatus (3) includes circuitry configured to: interchange, with a neighboring base station, information of a cell specific dynamic offset of a respective serving cell used for radio resource management, wherein the cell specific dynamic offset is related to transmission capability of a respective cell, and the transmission capability comprises at least one of a multi-antenna transmission performance gain of the cell and a load condition of the cell; and perform, based on the information of the cell specific dynamic offset of the serving cell of the base station and the cell specific dynamic offset of the serving cell of the neighboring base station, radio resource management on a user equipment of the base station.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 800 shown in FIG. 18) from a storage medium or network, wherein the computer is capable of implementing various functions when installed with various programs.

Figure 8:
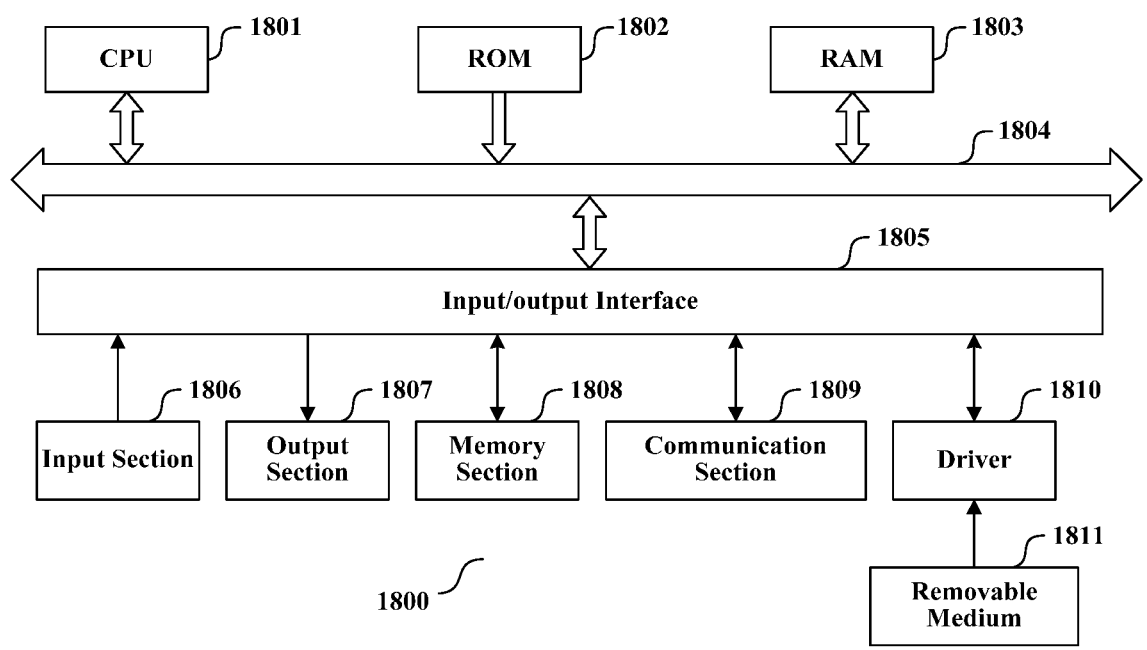
FIG. 8 is an exemplary block diagram illustrating the structure of a general purpose personal computer capable of realizing the method and/or device and/or system according to the embodiments of the present invention.

In FIG. 8, a central processing unit (CPU) 1801 executes various processing according to a program stored in a read-only memory (ROM) 1802 or a program loaded to a random access memory (RAM) 1803 from a memory section 1808. The data needed for the various processing of the CPU 1801 may be stored in the RAM 1803 as needed. The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet. A driver 1810 may also be linked to the input/output interface 1805. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved by software, programs forming the software are installed from a network such as the Internet or a memory medium such as the removable medium 1811.

It should be appreciated by those skilled in the art that the memory medium is not limited to the removable medium 1811 shown in FIG. 8, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

Application Example

The technology in the present disclosure can be applied to various products.

For example, the devices 300 and 400 on the side of the base station can be implemented as any type of evolved nodes B (eNB) such as a macro eNB and a small eNB. The small eNB may be an eNB such as a pico eNB, a micro eNB, and a home (femto) eNB that covers a cell smaller than a macro cell. Alternatively, the devices 300 and 400 on the side of the base station may be implemented as any other types of base stations such as a NodeB and a base transceiver station (BTS). The devices 300 and 400 on the side of the base station may include: a main body (that is also referred to as a base station apparatus) configured to control radio communication, and one or more remote radio heads (RRH) disposed in a different place from the main body. In addition, various types of terminals, which will be described below, may each operate as the devices 300 and 400 on the side of the base station by temporarily or semi-persistently executing a base station function For example, the devices 100 and 200 on the side of the user equipment may be implemented as a mobile terminal (such as a smart phone, a tablet personal computer (PC), a notebook PC, a portable game terminal, a portable/dongle type mobile router, and a digital camera), or an in-vehicle terminal (such as a car navigation apparatus). The terminal device 300 may also be implemented as a terminal (also referred to as a machine type communication (MTC) terminal) that performs machine-to-machine (M2M) communication. Furthermore, the devices 100 and 200 on the side of the user equipment may be a radio communication module (such as an integrated circuit module including a single die) mounted on each of the terminals described above.

[I. Application Example Regarding Base Station]

Figure 9:
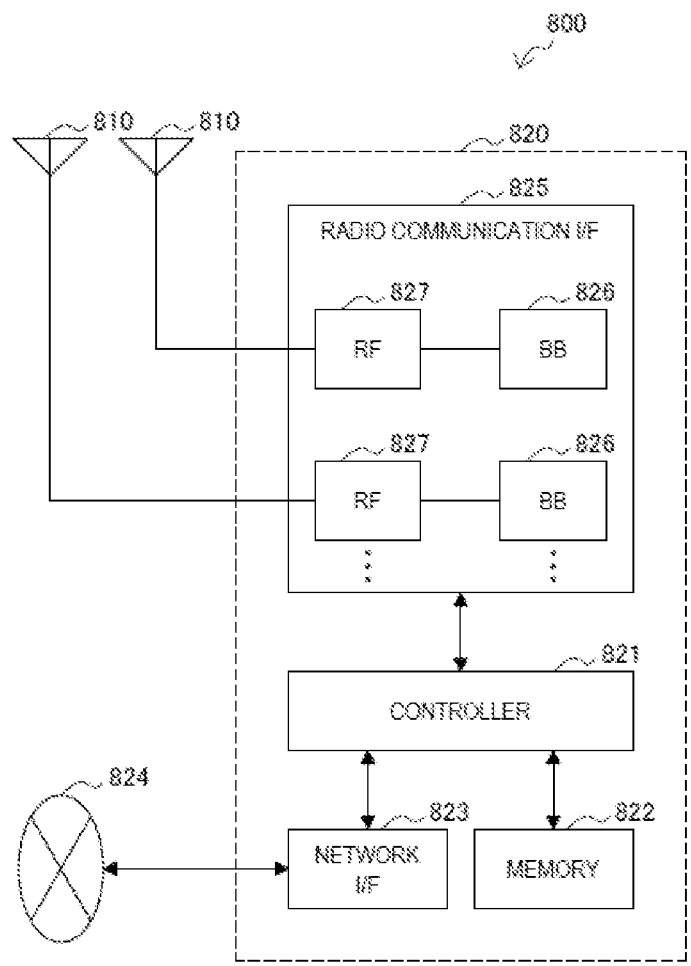
FIG. 9 is a block diagram showing an example of schematic configuration of an evolved node B (eNB) in which the technology according to the present disclosure is applied.

FIG. 9 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 9. For example, the multiple antennas 810 may be compatible with multiple frequency bands used by the eNB 800. Although FIG. 9 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

As shown in FIG. 9, the radio communication interface 825 may include the multiple BB processors 826. For example, the multiple BB processors 826 may be compatible with multiple frequency bands used by the eNB 800. The radio communication interface 825 may include the multiple RF circuits 827, as illustrated in FIG. 9. For example, the multiple RF circuits 827 may be compatible with multiple antenna elements. Although FIG. 9 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 9, the communication unit shown in FIG. 3 and FIG. 4 may be implemented by a wireless communication interface 825 and the wireless communication interface 855 and/or the wireless communication interface 863. At least part of the functions may be implemented by the controller 821. For example, the controller 821 may execute an operation to generate the instruction information containing the cell specific dynamic offset by executing the function of the instruction generating unit. The controller 821 may execute an operation to perform wireless resource management based on the cell specific dynamic offset by executing the function of the radio resource management unit.

[II. Application Example Regarding Terminal Device]

Figure 10:
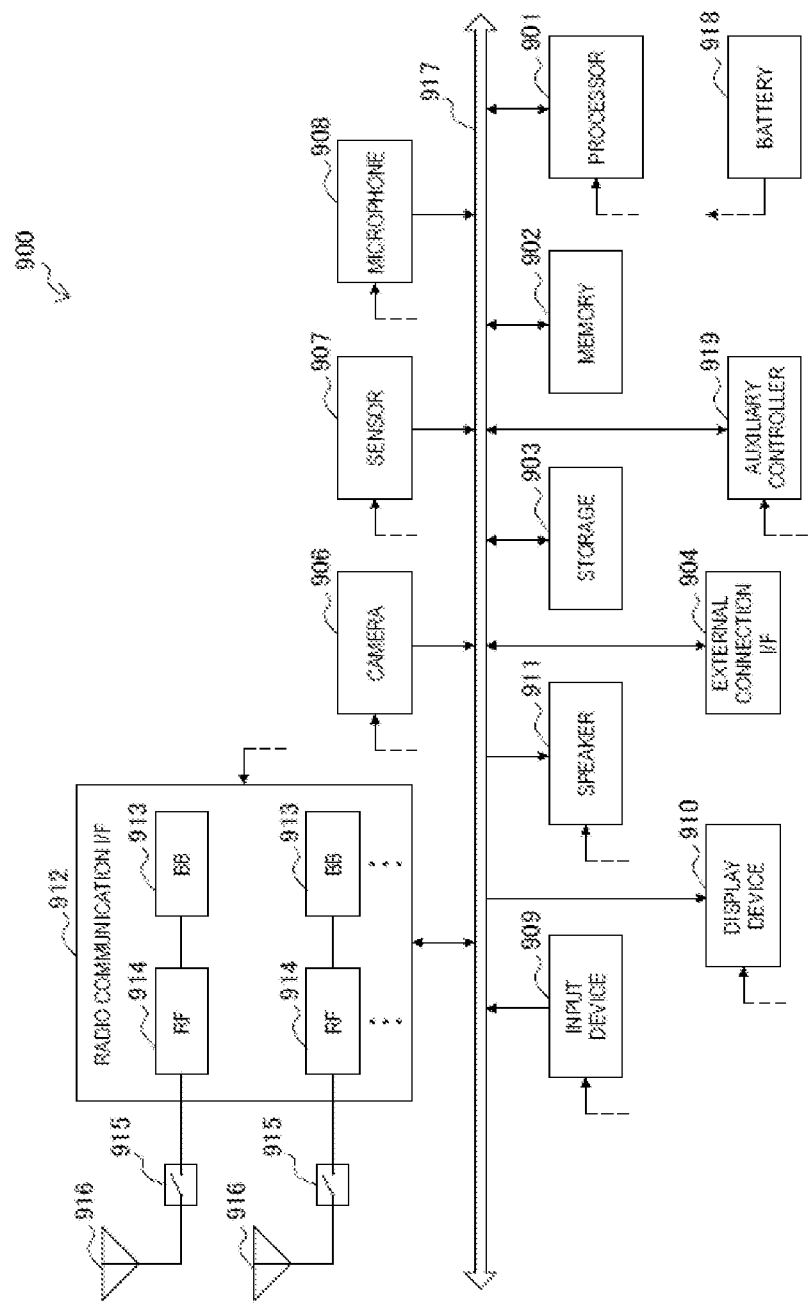
FIG. 10 is a block diagram showing an example of schematic configuration of a terminal device.

FIG. 10 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 10. Although FIG. 10 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 10. Although FIG. 10 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 10 via feeder lines, which are partially shown as dashed lines in the figure. The auxiliary controller 919 operates a minimum necessary function of the smartphone 900, for example, in a sleep mode.

In the smart phone 900 shown in FIG. 10, the information acquiring unit and the capability flag transmitting unit shown in FIG. 1 and FIG. 2 can be implemented by the wireless communication interface 912. At least part of the functions may be realized by the processor 901 and the auxiliary controller 919. For example, the processor 901 or the auxiliary controller 919 may execute an operation to measure a reference signal by executing a function of the measuring unit, and the processor 901 or the auxiliary controller 919 may execute an operation to perform cell reselection or measurement report based on the cell specific dynamic offset and the measurement result by executing the function of the cell reselection/measurement report unit.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A device for a base station apparatus side in wireless communications, comprising:
   circuitry configured to
   generate system information used by a user equipment for cell reselection, wherein a cell reselection parameter related to a cell load condition of a serving cell is contained in an information element SystemInformationBlockType3, and a cell reselection parameter related to a cell load condition of a neighboring cell is contained in an information element SystemInformationBlockType5;
   provide the system information to the user equipment;
   receive equipment capability flag from the user equipment after the cell reselection is completed, the equipment capability flag indicating that a cell specific dynamic offset related to the cell reselection parameter is taken into account when determining to a target cell of the cell reselection by the user equipment, the cell specific dynamic offset being related to at least one of a multi-antenna transmission performance gain of the serving cell and a multi-antenna transmission performance gain of the neighboring cell; and
   determine, in a subsequent transmission, a multi-antenna transmission scheme for the user equipment and the target cell preferentially, based on the equipment capability flag which indicates that the at least one of the multi-antenna transmission performance gain of the serving cell and the multi-antenna transmission performance gain of the neighboring cell is taken into account, when selecting the target cell.

2. The device according to claim 1, wherein the smaller the cell load of the neighboring cell is, the greater the opportunity of the neighboring cell being reselected as a target cell is.

3. The device according to claim 1, wherein the cell reselection parameter related to the cell load condition changes dynamically with a service state of the corresponding cell.

4. The device according to claim 3, wherein the device acquires information from an X2 communication interface, to determine the cell reselection parameter related to the cell load condition of the neighboring cell.

5. The device according to claim 1, wherein the circuitry is configured to receive the equipment capability flag in a RRC signaling.

6. The device according to claim 1, the multi-antenna transmission performance gain includes at least one of a pre-coding gain and a beam-forming gain of the corresponding cell.

7. The device according to claim 1, wherein the circuitry is further configured to define a new triggering event to receive a measurement report from the user equipment for handover, based on the cell specific dynamic offset.

8. The device according to claim 7, wherein the circuitry is configured to define the new triggering event based on at least one of:
   $Mn$ which is a measurement result on the neighboring cell without taking the offset into account,
   $Ofn$ which is a frequency specific offset for a frequency of the neighboring cell,
   $Ocn$ which is a static neighboring cell specific offset by OAM assignment,
   $Odn$ which is a cell specific dynamic offset of the neighboring cell,
   $Hys$ which is a hysteresis parameter of the event,
   $Mp$ which is a measurement result on a primary cell without taking the offset into account,
   $Ofp$ which is a frequency specific offset of a primary frequency,
   $Ocp$ which is a static primary cell specific offset by OAM assignment,
   $Ods$ which is a cell specific dynamic offset of the serving cell, and
   $Off$ which is an offset parameter for the triggering event.

9. The device according to claim 8, wherein the circuitry is configured to define the new triggering event based on two entering conditions:

$$Mn+Ofn+Ocn+Odn-Hys<Mp+Ofp+Ocp+Ods+Off,$$
and $$Mn+Ofn+Ocn-Hys > \text{a first threshold.}$$

10. The device according to claim 9, wherein the circuitry is configured to define the new triggering event based on two leaving conditions:

$$Mn+Ofn+Ocn+Odn-Hys<Mp+Ofp+Ocp+Ods+Off,$$
and $$Mn+Ofn+Ocn-Hys<0.$$

11. The device according to claim 8, wherein the circuitry is configured to define the new triggering event based on two entering conditions:

$$Mn+Ocn+Odn-Hys>Ms+Ocs+Ods+Off, \text{ and}$$

$$Mn+Ocn-Hys > \text{a first threshold.}$$

12. A device for a user equipment side in wireless communications, comprising:
circuitry configured to
acquire system information used by the user equipment for performing cell reselection, wherein a cell reselection parameter related to a cell load condition of a serving cell is acquired via an information element SystemInformationBlockType3, and a cell reselection parameter related to a cell load condition of a neighboring cell is acquired via an information element SystemInformationBlockType5;
measure the serving cell and the neighboring cell in a RRC idle state;
perform the cell reselection based on the cell reselection parameter related to the cell load condition and measurement results on the serving cell and the neighboring cell; and
transmit, to a base station, after the cell reselection is completed, equipment capability flag indicating that a cell specific dynamic offset related to the cell reselection parameter is taken into account when determining to a target cell of the cell reselection, the cell specific dynamic offset being related to at least one of a multi-antenna transmission performance gain of the serving cell and a multi-antenna transmission performance gain of the neighboring cell,
wherein the equipment capability flag which indicates that the at least one of the multi-antenna transmission performance gain of the serving cell and the multi-antenna transmission performance gain of the neighboring cell is taken into account, when selecting the target cell, is used to determine a multi-antenna transmission scheme for the user equipment and the target cell preferentially, in a subsequent transmission at the base station.

13. The device according to claim 12, wherein the smaller the cell load of the neighboring cell is, the greater the opportunity of the neighboring cell being reselected as a target cell is.

14. The device according to claim 12, wherein the circuitry is configured to transmit the equipment capability flag in a RRC signaling.

15. The device according to claim 12, wherein the measurement results comprises measurement values related to at least one of reference signal receiving power and reference signal receiving quality.

16. The device according to claim 15, wherein the circuitry is configured to rank measured cells based on the information of the cell reselection parameter and the measurement results, and determine a cell to be accessed based on a ranking result.

17. The device according to claim 12, wherein the circuitry acquires the information of the cell reselection parameter based on system information or historical information recorded in the user equipment.

18. The device according to claim 12, wherein the circuitry acquires the information of the cell reselection parameter of the serving cell and the neighboring cell by receiving a RRC signaling from the base station of the serving cell.

* * * * *